A. E. TRUESDELL.
PROCESS OF BURNING LIME.
APPLICATION FILED JULY 31, 1912.
1,180,455.
Patented Apr. 25, 1916.
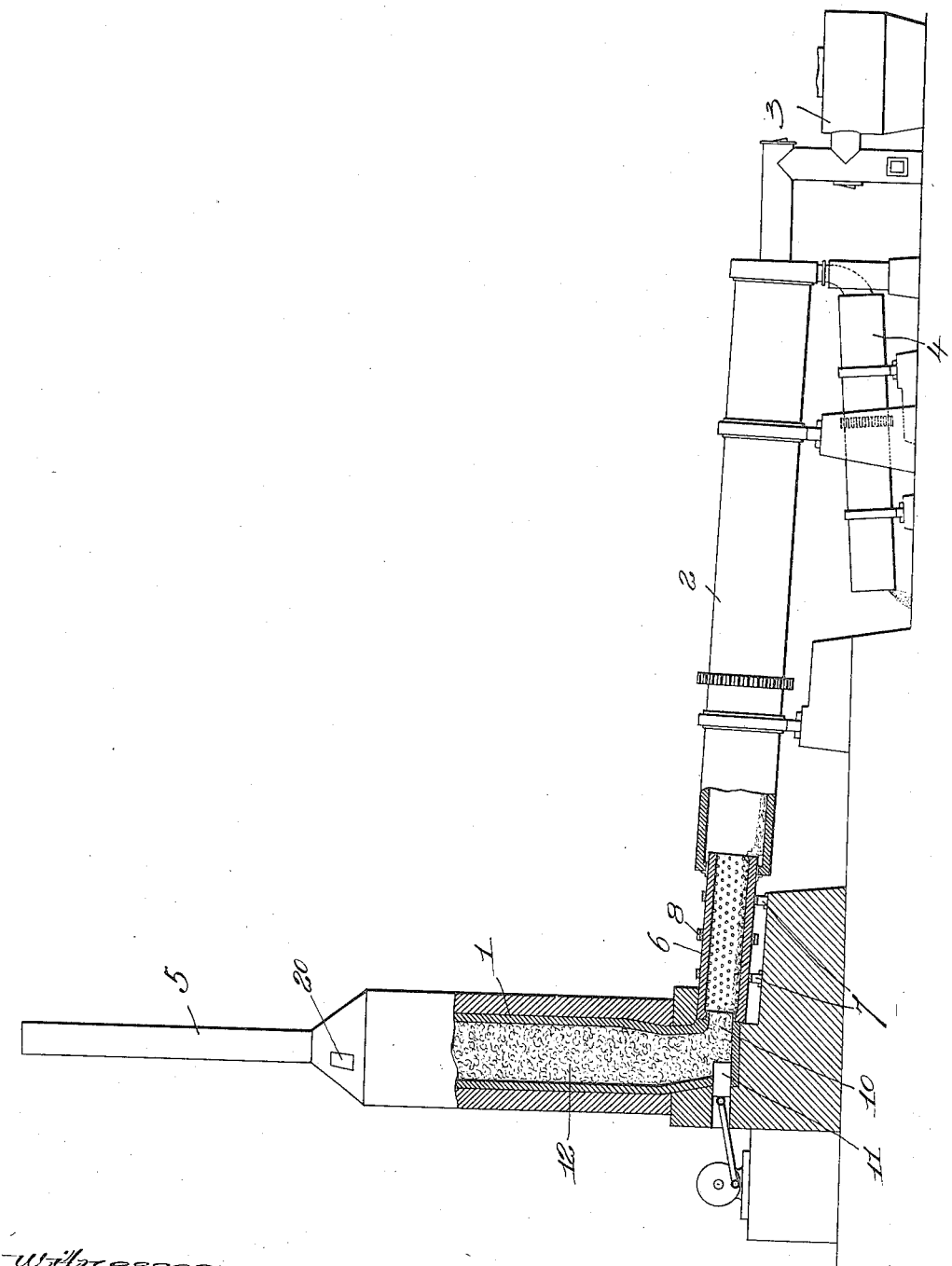

UNITED STATES PATENT OFFICE.

ARTHUR E. TRUESDELL, OF ADAMS, MASSACHUSETTS.

PROCESS OF BURNING LIME.

1,180,455.

Specification of Letters Patent. Patented Apr. 25, 1916.

Application filed July 31, 1912. Serial No. 712,465.

*To all whom it may concern:*

Be it known that I, ARTHUR E. TRUESDELL, a citizen of the United States, residing at Adams, county of Berkshire, State of Massachusetts, have invented an Improvement in Processes of Burning Lime, of which the following description, in connection with the accompanying drawing, is a specification, like characters on the drawing representing like parts.

This invention relates to a new and useful process of burning lime by which limestone, and especially limestone of a soft nature, can be more economically burned in a rotary kiln than is possible with any of the processes now in use, and further to provide a novel process by which the lime will be more uniformly burned and a higher grade product will be produced than is possible with the rotary kiln processes which have heretofore been used.

In burning lime in the rotary kiln the usual process is, first, to crush the limestone to such a size as to pass a ring four inches in diameter or less (depending somewhat on the nature of the stone) and then to introduce the crushed limestone without screening into the rotary kiln. This crushed material contains particles or lumps which vary greatly in size, and sometimes it contains as high as ten per cent. of limestone dust or powder. As the heat economy of a rotary kiln is naturally low, attempts have been made to increase their efficiency by introducing boilers and economizers into the path of the waste gases and by using dust chambers to prevent as much as possible the clogging of the draft passages through the boilers. It was found, however, that the waste heat boilers and dust chambers entailed considerable expense in cleaning and keeping in order besides interfering more or less with the continuous operation of the kiln, and to avoid this difficulty it has been proposed to utilize the waste heat from the rotary kiln to burn the limestone partially in a vertical kiln instead of utilizing it in boilers, economizers, etc., and then to feed the partially-burned limestone from the vertical kiln into the rotary kiln where the burning operation was completed. Where the vertical kiln was thus used it was found to be necessary to keep the limestone in as large pieces as practicable and with a minimum dust content in order to prevent the draft through the vertical kiln from becoming unduly clogged, and in order to secure a proper and complete burning of the large lumps or pieces before their discharge from the rotary kiln it was found necessary to maintain the temperature in the vertical kiln substantially at the point of disassociation from the limestone of its $CO_2$ gas, for if a lower temperature were employed in the vertical kiln the amount which the large lumps were burned in the rotary kiln was not sufficient to enable them to be completely burned during their passage through the rotary kiln. In such case an incompletely burned product would result.

The disadvantages which developed in the practical operation of the above processes were that where the large lumps were introduced into the vertical kiln the product was apt to be unevenly burned since both large lumps and small particles were subjected to the same heating; the use of waste heat boilers and dust chambers involved considerable expense in keeping them clean and caused more or less variation in the draft and also interfered with the continuous operation of the kiln; and the practical use of a vertical kiln with a rotary kiln as above outlined involved the use of an exhaust fan of large capacity and consequent heavy charge for power in order to maintain a proper draft.

I have improved the processes of burning lime above referred to in such a way as to produce a uniformly-burnt lime in a fine state with a minimum expenditure of fuel, and I accomplish this by first pre-heating uncrushed limestone to a temperature sufficient to soften it so that it will readily be disintegrated, but insufficient to effect the disassociation therefrom of its $CO_2$ gas, and then passing the heated limestone through a disintegrator which readily disintegrates or granulates and reduces it to a uniform granular condition, and then passing the disintegrated limestone through a rotary kiln where it is properly burned. The pre-heating of the rock to the desired temperature is accomplished entirely by heat which is discharged from the rotary kiln and, therefore, without the expenditure of any fuel other than that which is required for burning the lime, and the operation of crushing or disintegrating the limestone after it has thus been heated can be accomplished with very much less expenditure of power than when the limestone is cold. By my process, therefore, I not only produce a high grade lime of uniform size, but I secure it by a minimum expenditure of power and fuel and thus on an economical basis.

Referring to the drawings wherein I have illustrated an apparatus capable of carrying out my invention, 1 designates a vertically-disposed stationary kiln having an opening 20 in its top into which the limestone may be delivered, and 2 is a rotary kiln of any suitable construction.

3 is a gas producer for producing the heat to burn the lime in a rotary kiln. The lime is discharged from the rotary kiln into a rotary cooler 4, as usual. The construction and operation of the rotary kiln and its associated gas producer is well known to those skilled in the art and need not be further described. The stationary and rotary kilns are so situated relative to each other that the hot gases which are discharged from the rotary kiln pass into the lower end of the stationary kiln 1 and are discharged through the stack 5 thereof. Situated between the rotary kiln and the stationary kiln is a disintegrator 6 which may be of any suitable construction but is preferably a rotary disintegrator through which the limestone passes in moving from the stationary to the rotary kiln. This disintegrator is sustained in suitable bearings 7 and is rotated by any suitable means, and at such speed as may be desirable. As herein shown it is provided with exterior gear teeth 8 which mesh with and are driven by a suitable driving gear. The disintegrator will preferably be provided on its interior with projections or other means which will operate to disintegrate the material passing therethrough. The disintegrator is arranged to receive limestone from the lower end 10 of the stationary kiln and to discharge it into the upper end of the rotary kiln.

In carrying out my invention the limestone in its natural state and without being crushed is delivered into the stationary kiln 1 through the opening 20 and it is fed from the lower end of the stationary kiln to the disintegrator by any suitable means, such as the reciprocating plunger 11. During the burning operation the heat from the rotary kiln passes up through the stationary kiln 1 and heats the limestone 12 therein to a point at which it is easily disintegrated. The limestone, coarse and fine, is then passed into the disintegrator 6 in which it becomes thoroughly disintegrated and reduced to granular form of practically uniform size, this operation being very easily accomplished with the expenditure of a minimum amount of power because of the fact that the limestone is in an easily-disintegrable condition. The disintegrated limestone is then delivered to the rotary kiln where it is burned in usual manner. The result is a high grade lime of uniform quality.

It should be noted that the temperature at which the limestone becomes soft is considerably less than that which is necessary to effect the disassociation therefrom of its $CO_2$ gas.

Having fully described my invention, what I claim as new and desire to secure by Letters Patent is:—

1. The process of burning lime which consists first in passing uncrushed limestone in lump formation through a vertical kiln and heating it therein to a temperature where it will readily disintegrate, but which is insufficient to effect the disassociation therefrom of its $CO_2$ gas, then passing the heated limestone through a disintegrator in which the lumps are disintegrated and reduced to a granular form, and thence passing it into a rotary kiln where it is burned.

2. The process of burning lime which consists in passing uncrushed limestone in lump formation through a vertical kiln which is arranged to receive the hot gases delivered from a rotary kiln, utilizing said hot gases to heat the limestone in the vertical kiln to a temperature where it will readily disintegrate but which is insufficient to effect the disassociation therefrom of its $CO_2$ gas, passing the heated limestone through a disintegrator in which the lumps are disintegrated and reduced to a granular form, and then passing it into said rotary kiln where it is reduced to an oxid state.

3. The process of burning lime which consists in first heating uncrushed limestone as it comes from the quarry to a temperature at which it will readily disintegrate, but which is insufficient to effect the disassociation therefrom of its $CO_2$ gas, disintegrating the heated limestone while it is still being subjected to the heating operation thereby to reduce the limestone to substantially uniform granular form and then subjecting the disintegrated limestone to a higher temperature thereby to reduce it to an oxid state.

In testimony whereof, I have signed my name to this specification, in the presence of two subscribing witnesses.

ARTHUR E. TRUESDELL.

Witnesses:
   B. H. KENNEDY,
   E. G. TRUESDELL.